United States Patent
Gothoskar et al.

(10) Patent No.: US 7,187,837 B2
(45) Date of Patent: Mar. 6, 2007

(54) ACTIVE MANIPULATION OF LIGHT IN A SILICON-ON-INSULATOR (SOI) STRUCTURE

(75) Inventors: Prakash Gothoskar, Allentown, PA (US); Margaret Ghiron, Allentown, PA (US); Robert Keith Montgomery, Easton, PA (US); Vipulkumar Patel, Breinigsville, PA (US); Kalpendu Shastri, Orefield, PA (US); Soham Pathak, Allentown, PA (US); Katherine A. Yanushefski, Zionsville, PA (US)

(73) Assignee: SiOptical, Inc., Allentown, PA (US)

( * ) Notice: Subject to any disclaimer, the term of this patent is extended or adjusted under 35 U.S.C. 154(b) by 109 days.

(21) Appl. No.: 11/069,852

(22) Filed: Feb. 28, 2005

(65) Prior Publication Data

US 2005/0189591 A1    Sep. 1, 2005

Related U.S. Application Data

(60) Provisional application No. 60/547,911, filed on Feb. 26, 2004.

(51) Int. Cl.
  *G02B 6/26* (2006.01)
  *G02B 6/10* (2006.01)
  *H01L 29/22* (2006.01)
  *H01L 33/00* (2006.01)
  *H01L 27/14* (2006.01)
  *H01L 31/00* (2006.01)
(52) U.S. Cl. .......................... 385/131; 385/14; 385/39; 385/40; 385/129; 385/130; 257/94; 257/431; 257/432

(58) Field of Classification Search ........ 385/129–131; 257/94–96, 431, 432
See application file for complete search history.

(56) References Cited

U.S. PATENT DOCUMENTS

| | | | | |
|---|---|---|---|---|
| 6,298,177 | B1 * | 10/2001 | House | 385/3 |
| 6,374,001 | B1 * | 4/2002 | Bozeat et al. | 385/8 |
| 6,845,198 | B2 * | 1/2005 | Montgomery et al. | 385/50 |
| 6,968,110 | B2 * | 11/2005 | Patel et al. | 385/131 |

* cited by examiner

Primary Examiner—Brian Healy
Assistant Examiner—Charlie Peng
(74) Attorney, Agent, or Firm—Wendy W. Koba

(57) ABSTRACT

An arrangement for actively controlling, in two dimensions, the manipulation of light within an SOI-based optical structure utilizes doped regions formed within the SOI layer and a polysilicon layer of a silicon-insulator-silicon capacitive (SISCAP) structure. The regions are oppositely doped so as to form an active device, where the application of a voltage potential between the oppositely doped regions functions to modify the refractive index in the affected area and alter the properties of an optical signal propagating through the region. The doped regions may be advantageously formed to exhibit any desired "shaped" (such as, for example, lenses, prisms, Bragg gratings, etc.), so as to manipulate the propagating beam as a function of the known properties of these devices. One or more active devices of the present invention may be included within a SISCAP formed, SOI-based optical element (such as, for example, a Mach-Zehnder interferometer, ring resonator, optical switch, etc.) so as to form an active, tunable element.

37 Claims, 8 Drawing Sheets

# ACTIVE MANIPULATION OF LIGHT IN A SILICON-ON-INSULATOR (SOI) STRUCTURE

CROSS-REFERENCE TO RELATED APPLICATION

The present application claims the priority of U.S. Provisional Application No. 60/547,911, filed Feb. 26, 2004.

TECHNICAL FIELD

The present invention relates to the active manipulation of light in a silicon-on-insulator (SOI) structure and, more particularly, to a silicon-insulator-silicon capacitive (SISCAP) structure that is doped in selected areas to provide the desired control of one or more optical beams propagating through the SOI structure.

BACKGROUND OF THE INVENTION

A planar lightwave circuit (PLC) is the optical equivalent of an electronic chip, manipulating and processing light signals rather than electronic signals. In most cases, a PLC is formed in a relatively thin layer of glass, polymer or semiconductor formed on a semiconductor substrate. The lightwave circuit itself is composed of one or more optical devices interconnected by optical waveguides, the waveguides functioning to guide the light from one optical device to another and therefore considered as the optical equivalent of the metal interconnections in an electronic chip. The optical devices may comprise either passive optical devices, or active electro-optic devices, performing functions including, for example, reflection, focusing, collimating, beam splitting, wavelength multiplexing/demultiplexing, switching modulation and detection, and the like.

As of now, the common planar optical devices formed in a silicon-on-insulator (SOI) structure use a relatively thick (>3–4 μm) silicon surface waveguiding layer (hereinafter referred to as an "SOI layer"), so as to allow for relative ease of input/output coupling of a light signal to the SOI layer through methods such as edge illumination. However, the need for edge-illumination coupling requires access to the edge of the chip, as well as the formation of an edge with a high surface quality (to prevent reflections and backscattering at the coupling interface). Further, the fabrication of high definition structures is considered to be rather difficult in a relatively thick SOI layer (for example, forming "smooth" vertical sidewalls for waveguides, rings, mirrors, etc.). The thickness of the silicon also prevents the use of conventional CMOS fabrication processes to simultaneously form both the electronic and optical components. Additionally, optical structures formed in such a relatively thick layer will tend to support the propagation of multiple optical modes, complicating the ability to provide transmission of only the fundamental mode through the structure. Moreover, the relatively large thickness of the SOI layer also limits the speed of the electronic devices.

Once the thickness of the SOI layer is limited to being less than one micron, most of the above-described problems are significantly reduced, if not completely eliminated. However, in order to form a viable photonic circuit in a sub-micron thick SOI layer, the need remains to be able to actively manipulate the light within the SOI layer. More particularly, the need exists to perform various optical functions, such as turning, focusing, modulating, attenuating, deflecting, switching and selectively dispersing the light propagating sub-micron thick SOI layer, preferably utilizing conventional CMOS-compatible voltage levels to accomplish the active manipulation so that a common power supply may be used to control optical and electrical components formed on a common silicon substrate.

SUMMARY OF THE INVENTION

The needs remaining in the prior art are addressed by the present invention, which relates to the active manipulation of light in a silicon-on-insulator (SOI) structure and, more particularly, to a silicon-insulator-silicon capacitive (SISCAP) structure that is doped in selected areas to provide the desired control over one or more optical beams propagating through the SOI structure.

In accordance with the present invention, the SISCAP structure includes the relatively thin (i.e., sub-micron) silicon surface layer (hereinafter referred to as "SOI layer") of an SOI structure, in combination with a relatively thin dielectric layer (referred to in the art as a "gate oxide") and an overlying silicon layer (usually comprising a form of polysilicon). The polysilicon layer and SOI layer are processed to form complementarily doped regions of a desired shape in proximity to the gate oxide, forming an active device region. Without the application of an electrical bias voltage, the doped SISCAP structure functions as a conventional SOI-based waveguiding arrangement. Upon the application of an electrical bias between the polysilicon and SOI layers, the refractive indexes of the doped regions will be modified and, depending upon the shapes of the doped regions, the propagating light beam will be manipulated in a desired manner.

It is an aspect of the present invention that the doped region(s) within the SOI layer and polysilicon layer may exhibit different shapes, and may be biased to different voltage levels. Indeed, the utilization of conventional CMOS processing/doping techniques allows for multiple doped regions to be formed in the SOI layer and/or the polysilicon layer so that optical elements such as gratings (and Fresnel lenses) can be formed.

By controlling the electrical voltages applied to the structures of the present invention, optical devices such as switches, polarization combiners, filters, ring resonators, Bragg gratings, Mach-Zehnder interferometers and the like may be formed and controlled. Indeed, a feedback path may be included between the optical output and the electrical bias input to perform optical control functions.

Other and further aspects and features of the present invention will become apparent during the course of the following discussion and by reference to the accompanying drawings.

BRIEF DESCRIPTION OF THE DRAWINGS

Referring now to the drawings,

FIG. 3(a) illustrates the device without the application of any electrical signal, FIG. 3(b) illustrates the focusing properties associated with the application of a first exemplary voltage potential across the device, and FIG. 3(c)

Figure 4A:
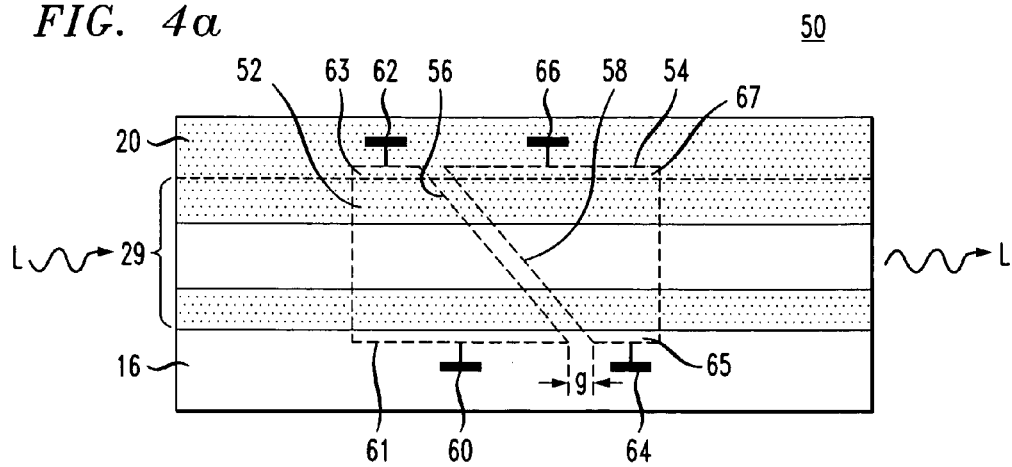
Figure 4B:
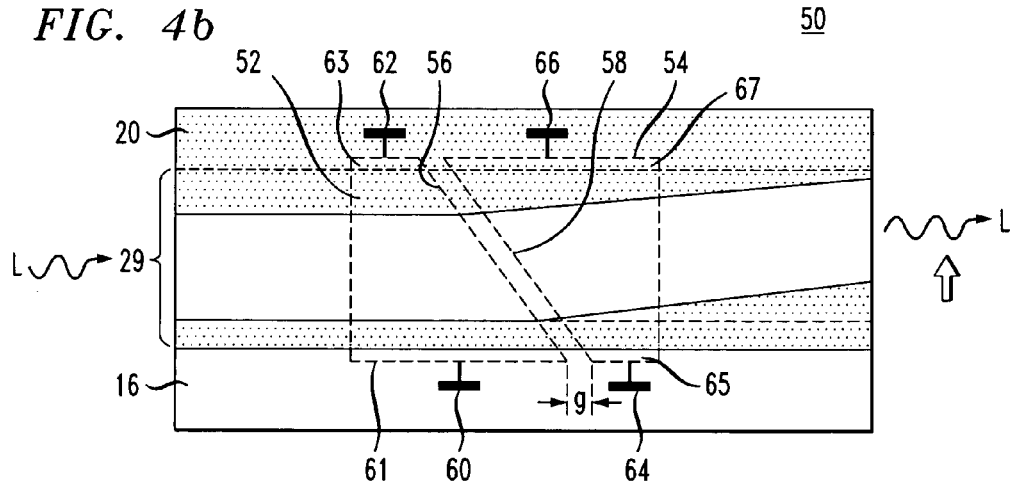
Figure 4C:
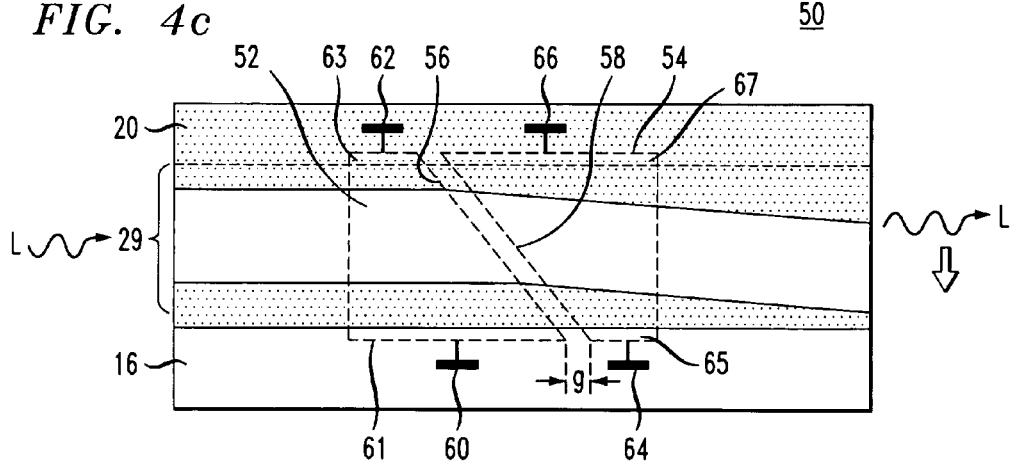
Figure 5:
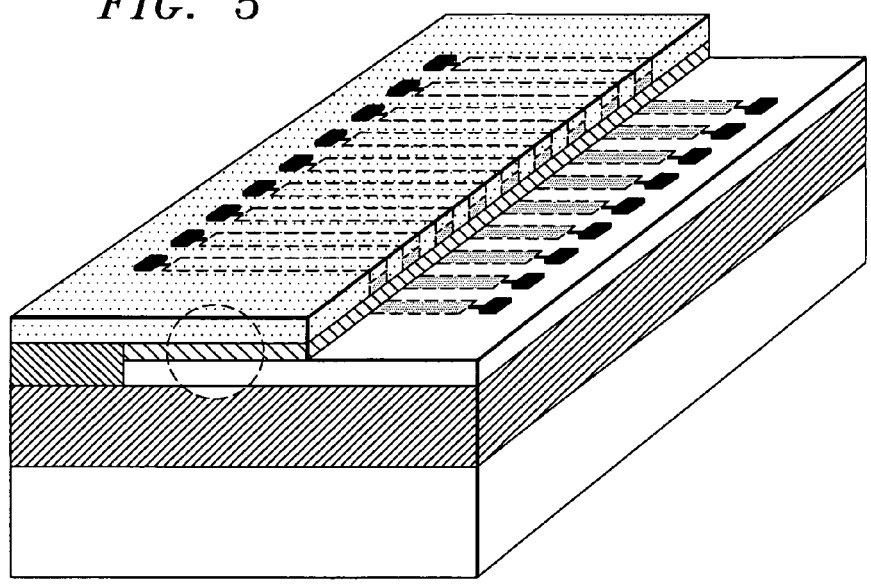
Figure 6:
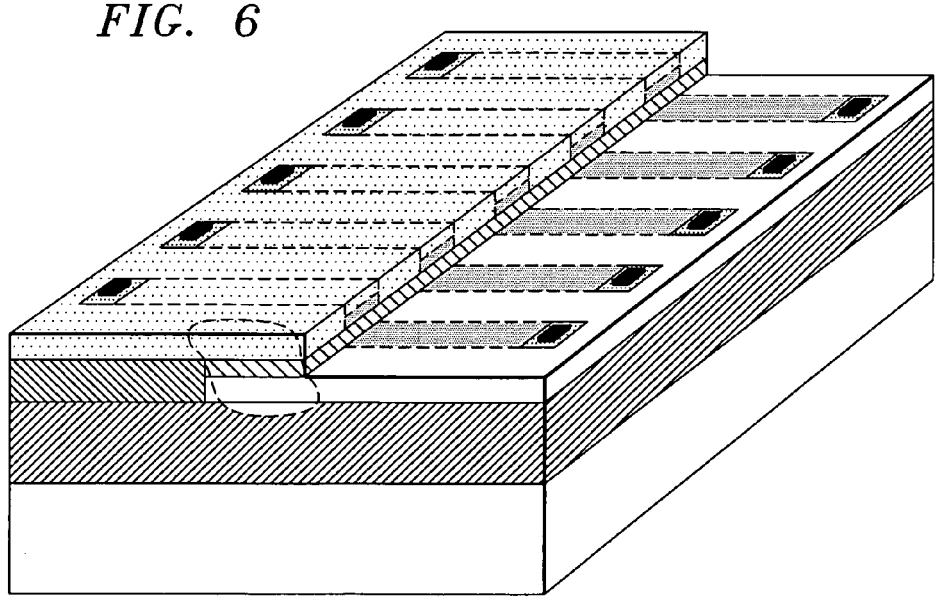
Figure 7:
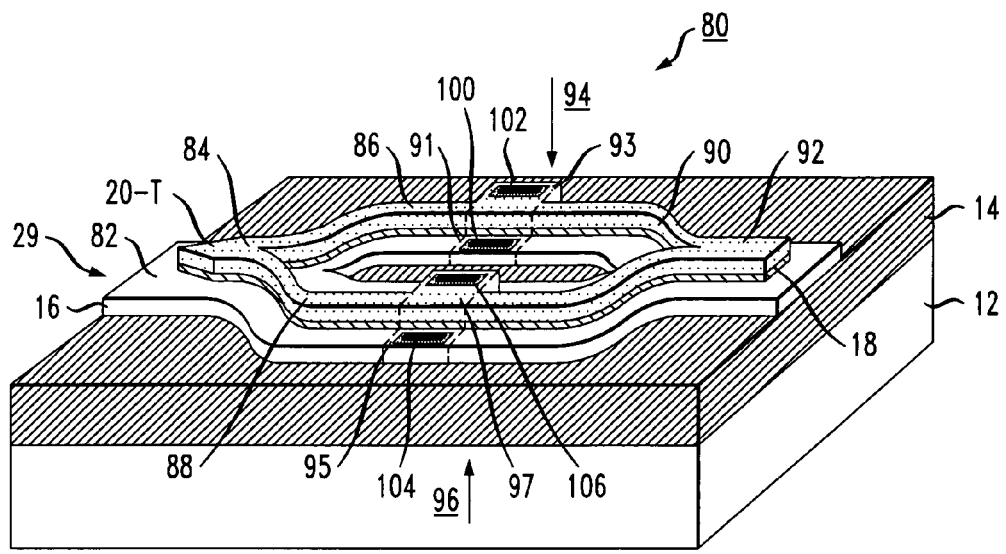
Figure 7A:
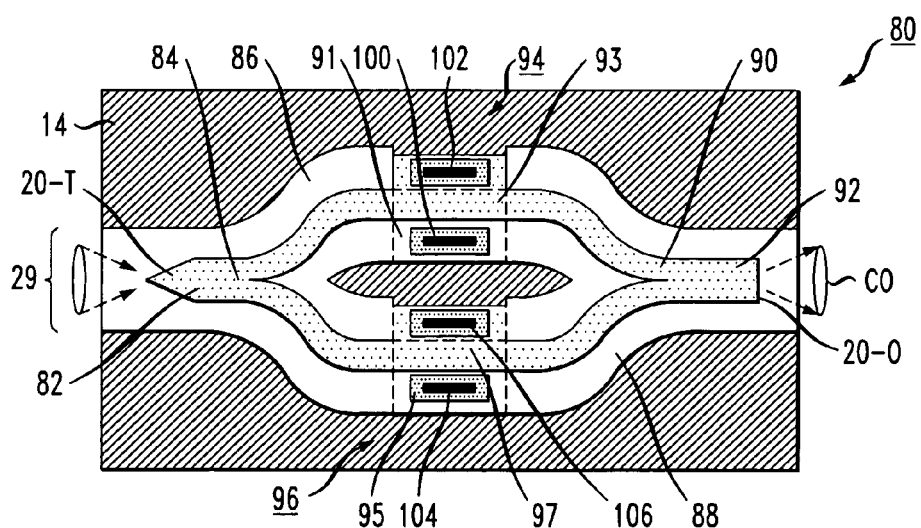
Figure 8:
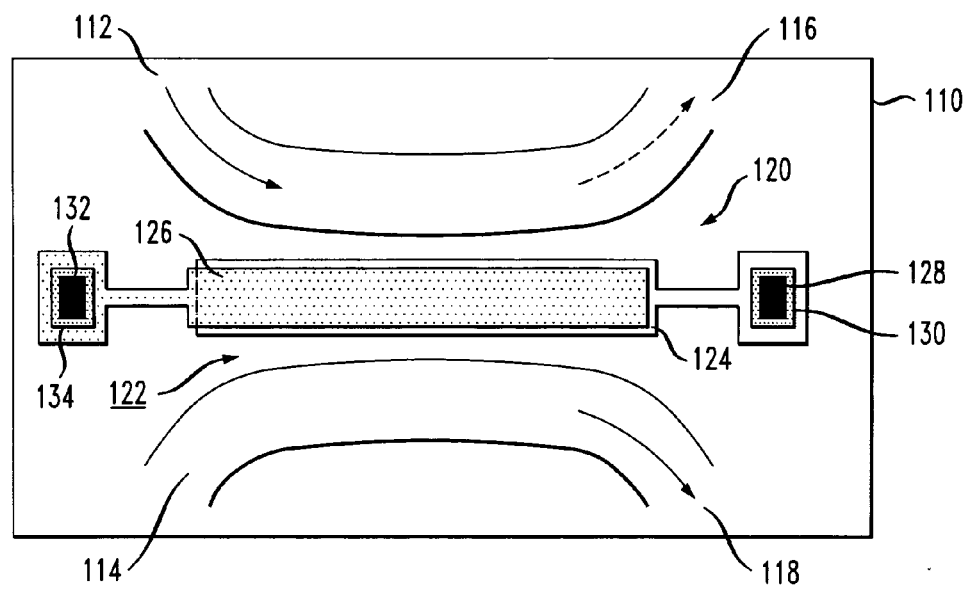
Figure 9:
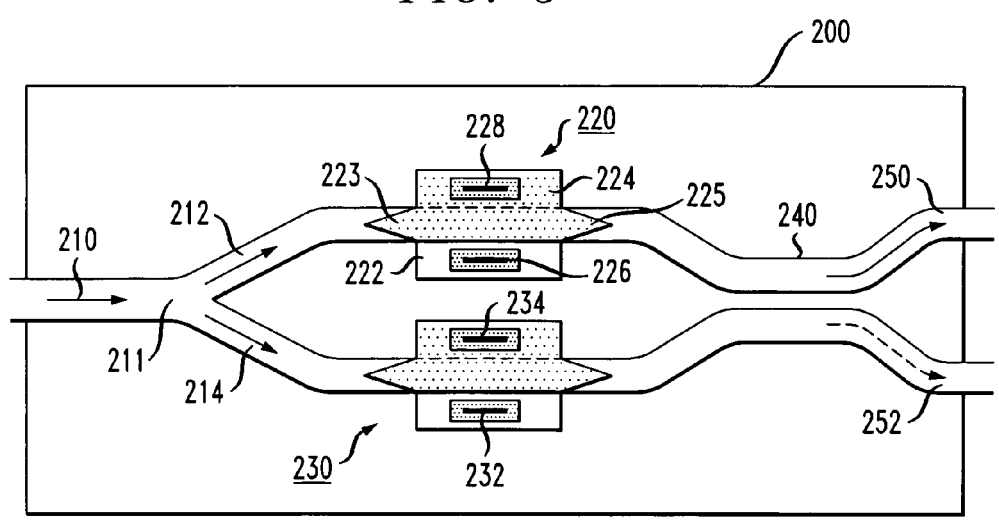
Figure 10:
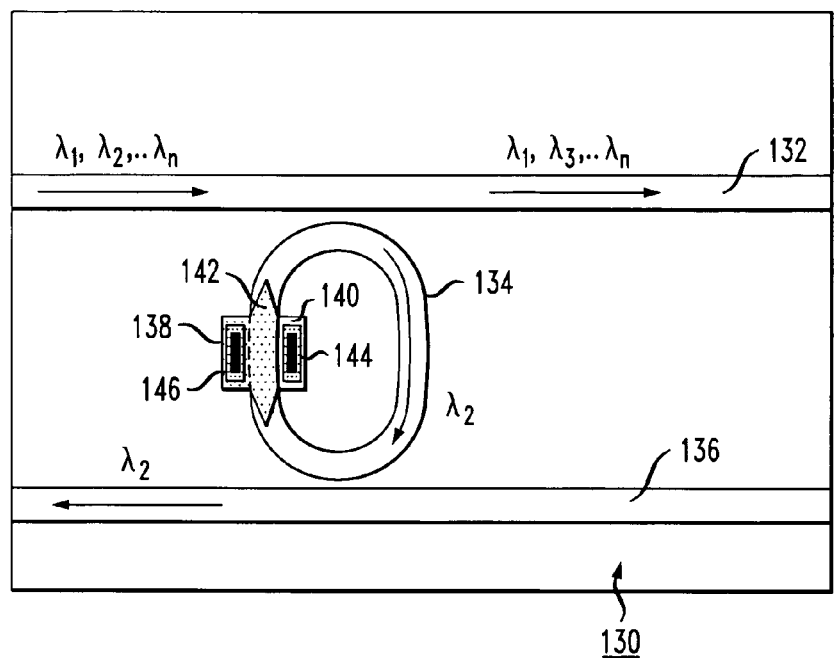
Figure 11:
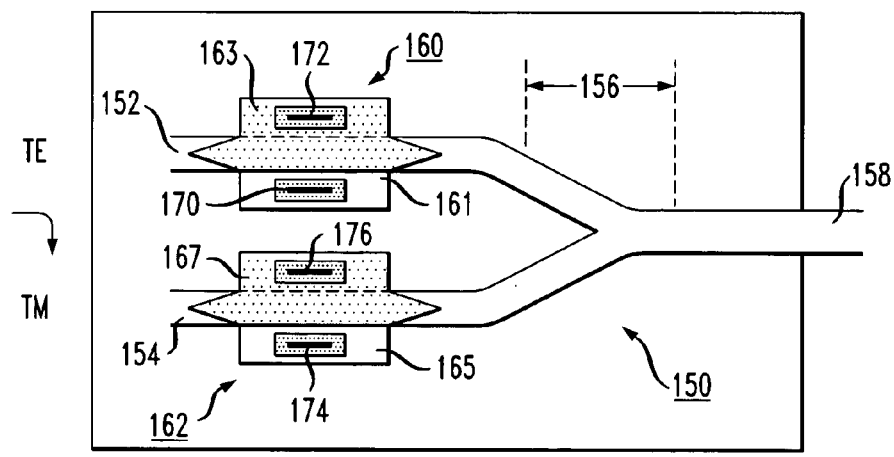
Figure 12:
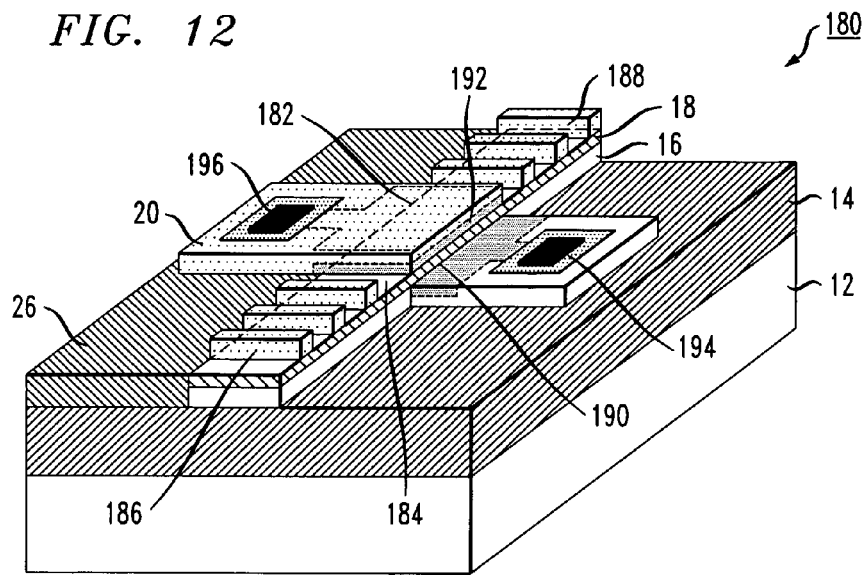
Figure 13:
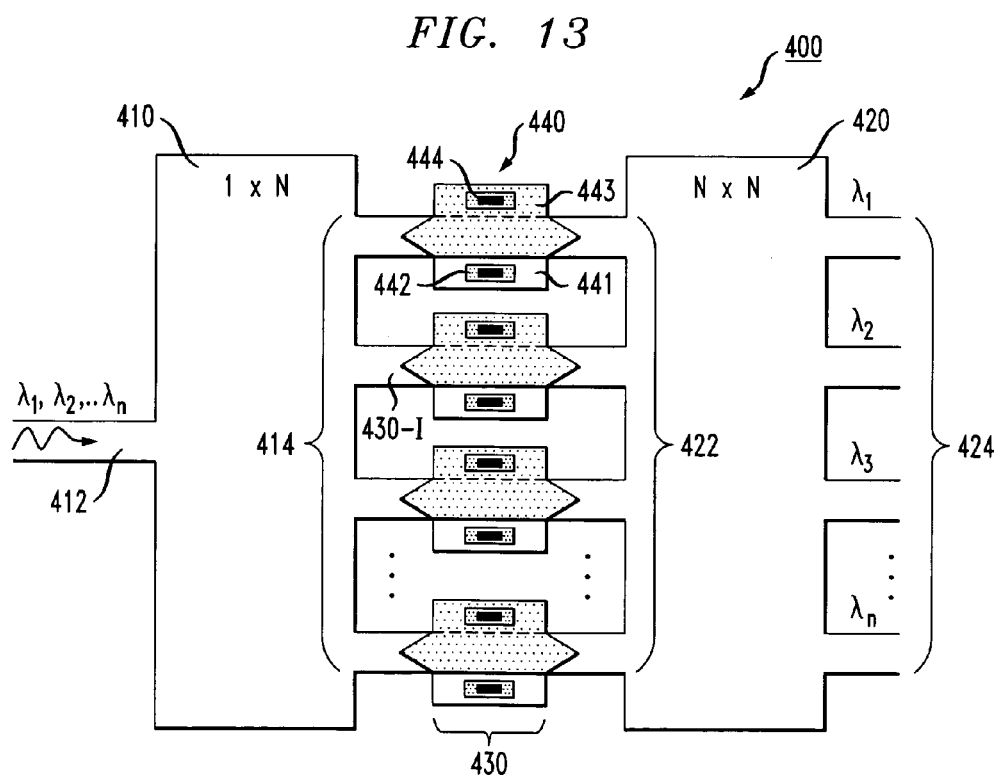

illustrates the focusing properties associated with the application of a second exemplary voltage potential across the device;

FIGS. 4(a)–(c) illustrate an exemplary beam steering active device formed in accordance with the present invention utilizing a pair of prism-shaped doped regions in the SOI structure, where FIG. 4(a) illustrates the device without the application of any electrical signal, FIG. 4(b) illustrates the beam steering properties associated with the application of a first exemplary voltage potential across the device, and FIG. 4(c) illustrates the beam steering properties associated with the application of a second exemplary voltage potential across the device;

FIG. 5 illustrates, in an isometric view, an exemplary slab-based active Bragg grating structure formed in accordance with the present invention;

FIG. 6 illustrates, in an isometric view, an exemplary rib-based active Bragg grating structure formed in accordance with the present invention;

FIGS. 7(a) and (b) contains a diagram of an exemplary active, tunable Mach-Zehnder interferometer formed in accordance with the present invention, with FIG. 7(a) illustrating a top view and FIG. 7(b) illustrating an isometric view;

FIG. 8 illustrates an exemplary active optical switch formed in accordance with the present invention;

FIG. 9 illustrates an alternative arrangement of an active optical switch formed in accordance with the present invention;

FIG. 10 contains a diagram of an exemplary add/drop ring resonator structure formed in accordance with the present invention;

FIG. 11 illustrates an exemplary on-chip active polarization controller formed in accordance with the present invention;

FIG. 12 illustrates, in an isometric view, an active Fabry-Perot device formed in accordance with the present invention; and FIG. 13 contains a top view of an exemplary arrayed waveguide (AWG) structure formed in accordance with the present invention.

DETAILED DESCRIPTION

Unstrained, pure silicon exhibits no linear electro-optic (Pockels) effect, and non-linear effects such as the Franz-Keldysh and Kerr effects are very weak in pure silicon. For the Kerr effect, an applied field in the range of $10^5$ V/cm produces a change in the refractive index on the order of only about $10^{-8}$ to $10^{-5}$. The most effective mechanisms to vary the refractive index/optical absorption of light in silicon are the free carrier effect ($\Delta n \sim 10^{-3}$) and the thermo-optic effect ($\Delta n \sim 10^{-4}$). The thermo-optic effect is defined as a change in the refractive index due to a change in the temperature of the silicon. The thermo-optic effect is rather slow (on the order of <1 MHz), and finds limited applications in today's high speed communication applications.

Figure 1:
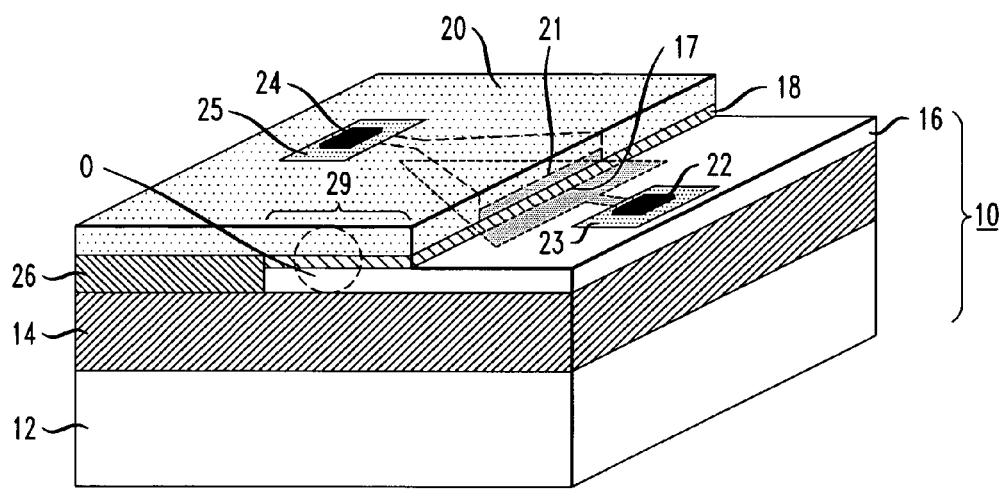
FIG. 1 contains an isometric view of an exemplary SOI-based SISCAP device including the capability to actively manipulate the propagation of a lightwave signal in accordance with the present invention.

The present invention is based upon the utilization of the free carrier effect in thin SOI (sub-micron) waveguide geometry. The waveguide geometry more particularly utilizes a SISCAP structure comprising a relatively thin oxide disposed over the surface (sub-micron) SOI layer, with a silicon layer (usually comprising a form of polysilicon) formed over the thin oxide in a manner to create an overlap with a portion of the SOI layer and form an active device region. FIG. 1 contains an isometric view, and FIG. 2 a cut-away side view of one such device. As shown, the device is formed within an SOI structure 10 including a silicon substrate 12, insulating layer 14, and sub-micron thick silicon surface layer (SOI layer) 16. A relatively thin oxide (gate oxide) 18 is formed over a surface portion of SOI layer 16, and a polysilicon layer 20 is formed over gate oxide 18 and SOI layer 16 to form the illustrated overlapped structure. An insulating layer 26 is disposed adjacent to SOI layer 16 to provide for lateral confinement of the propagating optical mode. Advantageously, the same dielectric layer that is used to form the "gate oxide" for CMOS electronic devices on the common substrate may be used to form gate oxide 18 for the various active optical devices as described hereinbelow. By using a similar gate dielectric as used for CMOS electronic devices ("similar" in terms of both material choice and thickness), similar voltage levels (e.g., ±3.5 V) can be used to provide the free carrier movement necessary for active optical device operation. Throughout the course of the following description, layer 20 will be referred to as comprising "polysilicon". It is to be understood that various types of silicon/polysilicon may be used to form this layer, including (but not limited to), amorphous silicon, grain-size enhanced polysilicon, grain-boundary passivated polysilicon, grain-boundary aligned polysilicon, single crystal silicon, substantially single crystal silicon and Ge-doped silicon.

The active switching and tuning functionality of the present invention is produced, as mentioned above, by free carrier modulation methods. The key to such optical manipulation is that the associated electronic control devices are integrated with the optical devices in the same SOI structure 10 so as to alter the index characteristics of the free carriers in active region 29 of SOI structure 10. One way to accomplish this is to fabricate an electronic device around an optical waveguide (e.g., a "rib" or effective index rib). The electronic device operation modifies the optical properties of the waveguide (the real and the imaginary parts of the refractive index) affecting the optical mode(s). The sub-micron dimensions of the device and the tight confinement of light (in most cases, supporting propagation of only the fundamental mode of the lightwave signal) enable the effective use of free carriers. The free carrier effect can be exploited using either the phase change of light due to the change in the real part of the index ($\Delta n$) or attenuation due to the imaginary part of the index ($\Delta k$) to provide free carrier modulation in any of the depletion, accumulation or inversion modes. In particular, the real part of the refractive index is related to the phase shift through the following equation:

$$\Delta \phi = \left( \frac{2\pi \Delta n L}{\lambda} \right)$$

where L is the path length in the waveguide over which the index has changed and $\lambda$ is the wavelength of the light propagating in the waveguide. The change in the absorption coefficient is related to the imaginary index as shown below:

$$\Delta \alpha = \left( \frac{4\pi \Delta k}{\lambda} \right).$$

In light of the above, it has been found that active functionality can be achieved by appropriately doping selected portions of the waveguiding structure formed by the overlap of SOI layer 16, gate oxide 18 and polysilicon layer 20 (i.e., with the doping, thus forming active region 29) and placing electrodes in association with each doped portion (illustrated as a first electrode 22 associated with SOI layer 16 and a second electrode 24 associated with polysilicon layer 20). A two-dimensional electron (hole) gas (2DEG) is formed on both sides of gate oxide 18 within active region 29 by applying a defined voltage between electrodes 22 and 24. An advantage of the present invention is that large free carrier concentration changes are achievable on both sides of gate oxide layer 18 where a high optical electric field exists (i.e., the center of the optical mode O as shown in FIGS. 1 and 2).

Figure 2:
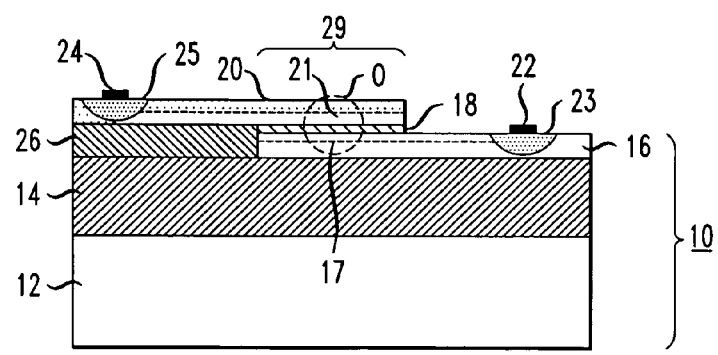
FIG. 2 is a cut-away side view of the arrangement of FIG. 1.

In the particular device arrangement as illustrated in FIGS. 1 and 2, a collimated beam O is illustrated as passing through a slab waveguide formed in the SOI structure. As shown, triangular-shaped doped regions are formed in SOI layer 16 and polysilicon layer 20 in the vicinity of gate oxide 18. More particularly, a first doped region 17 is formed in SOI layer 16 in the area directly underneath gate oxide 18 and a second doped region 21 is formed in polysilicon layer 20 in the area directly above gate oxide 18, where regions 17 and 21 are formed to exhibit complementary doping types (typically, SOI layer 16 is p-doped and polysilicon layer 20 is n-doped, although the reverse may be used as well). It is to be understood that conventional CMOS process techniques may be used to sequentially mask and implant SOI layer 16 and polysilicon layer 20 to form the desired patterns in the doped areas, while also providing the necessary doping profile and overlap in the vertical direction between doped regions 17 and 21.

In preferred embodiments of the present invention, electrodes 22 and 24 are located at a predetermined distance from active region 29—the region of optical signal propagation and manipulation, so as to minimize optical loss. As shown in FIGS. 1 and 2, a pair of heavily-doped regions 23 and 25 are formed in association with electrodes 22 and 24 to provide the necessary electrical contact to SOI layer 16 and polysilicon layer 20, respectively, where these regions are also in contact with doped regions 17 and 21 to form the required electrical signal path. While the remote location of electrodes 22 and 24 with respect to the optical signal path will reduce loss, the requisite spacing results in limiting the operational speed of the active device. Thus, in most cases, a trade-off will be determined between loss and speed and the electrical contacts will be positioned at the "best" locations on a case-by-case basis. That is, in situations where speed is important (such as optical modulation), an additional amount of optical loss may be tolerated and the contacts positioned relatively close to the active region. Conversely, in situations where maximum signal throughput is important, such as when focusing a beam into a single mode waveguiding region, a decrease in operational speed will be tolerated.

As mentioned above, the shape of the doped region(s) can be tailored such that a specific optical transfer function ("OTF") is achieved within the optical signal propagating along the waveguide (i.e., "active manipulation of light"). A variety of such shapes will be discussed hereinbelow in association with the description of various active optical devices. It is to be understood that the active devices discussed below are exemplary only of the principles of the present invention; virtually any possible shape/doping profile may be used in an SOI-based SISCAP structure in order to form active optical devices of the present invention. Indeed, a thorough discussion of various SISCAP structures and doping variations may be found in commonly-assigned U.S. Pat. No. 6,845,198, which is herein incorporated by reference.

Figure 3A:
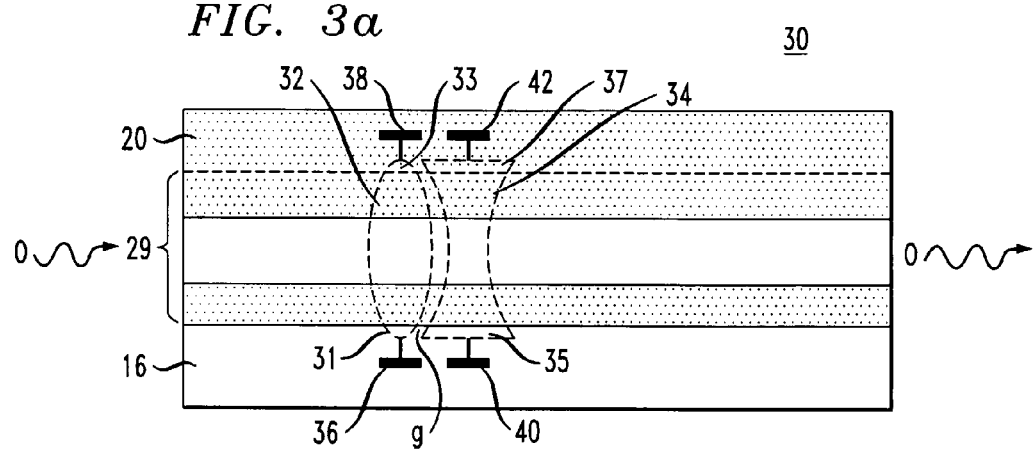
FIGS. 3(a)–(c) illustrate an exemplary beam shaping active device formed in accordance with the present invention, where
Figure 3B:
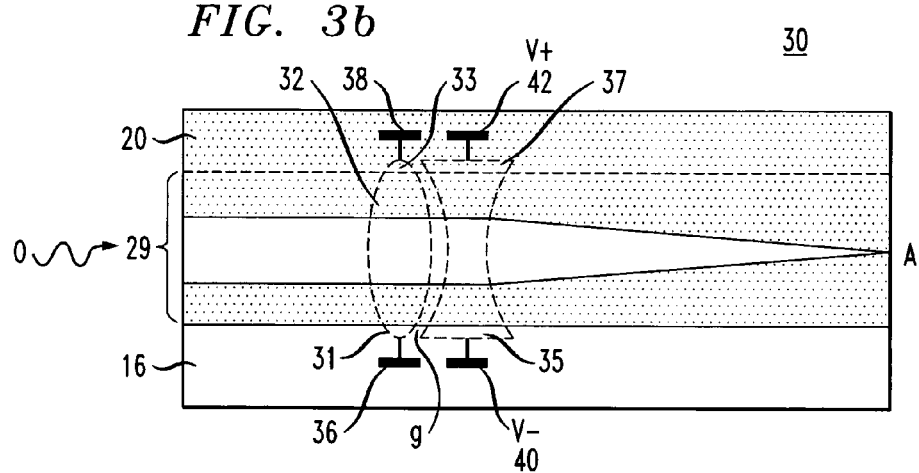
Figure 3C:
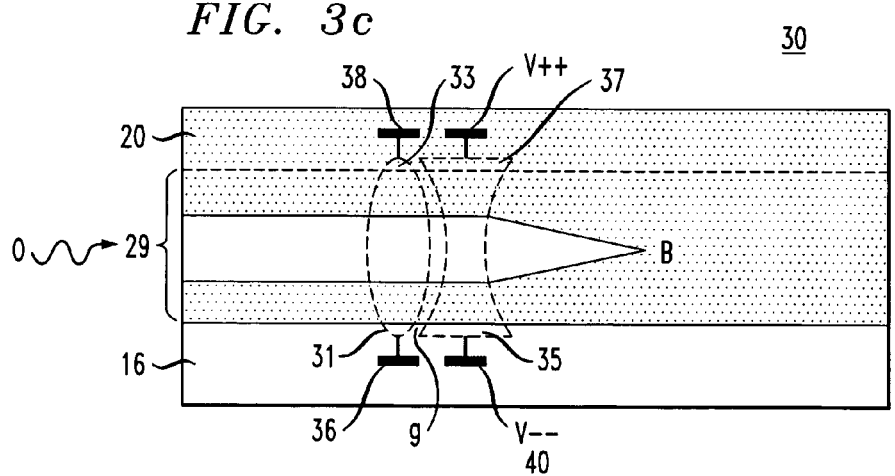

FIGS. 3($a$)–($c$) illustrate (in a top view) three different activation circumstances for an active SISCAP optical device 30 of the present invention. In this case, active SISCAP device 30 comprises a first doped region 32 shaped to function as a lens and a second lens-shaped doped region 34 separated from first lens region 32 by a predetermined isolating gap g. Similar to the generic structure of FIGS. 1 and 2, first doped lens region 32 includes an n-type doped area 31 formed in SOI layer 16 and a p-type doped area 33 formed in polysilicon layer 20 (or complementarily doped, as discussed above), where each area 31, 33 is properly shaped (using conventional CMOS masking and dopant implantation processes) to provide the desired lensing function. Second doped lens region 34 similarly comprises an n-type doped area 35 in SOI layer 16 and a p-type doped area 37 in polysilicon layer 20 that combine to form the predetermined lens shape. A first pair of electrodes 36, 38 is used to contact doped area 31 and doped area 33, respectively, in the region of first lens 32. A second pair of electrodes 40, 42 is used to contact doped area 35 and doped area 37, respectively, in the region of second lens 34. Although not particularly illustrated in FIG. 3 (or in the remaining drawings), it is to be understood that a heavily-doped contact area is formed in the silicon material directly underneath each electrode, so as to form a high conductivity connection.

In accordance with the present invention, by controlling the voltages applied to each electrode 36–42, the focusing properties of first lens 32 and second lens 34 can be controlled. In the diagram as illustrated in FIG. 3($a$), when no voltage is applied to any of the electrodes, the lensing structure behaves as a passive optical waveguiding device, since the back-to-back lens structures will nullify each other's dispersion. When the appropriate voltages are applied to the electrodes, the index of the doped regions will change, resulting in shaping the phase front of the optical mode and accomplishing the focusing function. In particular, in the depiction of FIG. 3($b$), a first set of voltages (illustrated as $V^+$ and $V^-$) is applied to electrical contacts 40 and 42, reducing the effective index within second lens 34 such that a propagating beam is focused at a point A. By modifying the respective voltage levels (illustrated as $V^{++}$ and $V^{--}$ in FIG. 3($c$)), the focus can be moved to a point B, as shown. The application of voltages to first lens 32 will result in a different type of beam shaping. In general, any collection of lenses may be used to provide the desired optical beam shaping in accordance with the present invention, including beam expansion as well as beam focusing. The ability to dynamically adjust the focusing properties of waveguide lenses, in accordance with the present invention, allows for a propagating lightwave to be focused into relatively narrow (sub-micron) single mode waveguides, an important need in future SOI-based opto-electronic systems. Moreover, the ability to actively modify the focal point of a lensing arrangement allows for adjustments to be made as needed for process variations, ambient temperature variations, aging variations, and the like.

Instead of actively adjusting the focal point of a propagating beam, a set of differently-shaped doped regions may be formed in an SOI-based SISCAP structure to provide controlled deflection of an optical signal (i.e., beam steering). FIGS. 4($a$)–($c$) illustrate one such beam deflector 50 formed in accordance with the present invention. In this case, a pair of prism-shaped doped regions 52 and 54 are formed within active waveguide region 29 in the overlap of SOI layer 16, gate oxide 18 (as shown in FIGS. 1 and 2) and polysilicon layer 20. The prisms are oriented, as shown in the figures, such that an angled facet 56 of first prism-shaped region 52 is adjacent to angled facet 58 of second prism-shaped region 54 (with a necessary isolation gap g therebetween). As discussed above, the doped regions are created by properly masking and implanting pre-defined areas of SOI layer 16 and polysilicon layer 20. In one embodiment, SOI layer 16 may be implanted with an n-type dopant within a portion of active region 29 contiguous with gate oxide 18 to form a first doped region 61. Polysilicon layer 20 may be implanted with a p-type dopant in a portion of action region 29 to form a second doped region 63 (the converse arrangement is possible, with SOI layer 16 processed to include p-type areas and polysilicon layer 20 to include n-type areas). A first pair of electrodes 60, 62 is illustrated as associated with first prism region 52, with electrode 60 disposed to modify the index within doped region 61 of SOI layer 16 and electrode 62 disposed to modify the index within doped region 63 of polysilicon layer 20. A second pair of electrodes 64, 66 is associated with second prism region 54, with electrode 64 disposed to control the index of a doped region 65 within SOI layer 16 and electrode 66 disposed to control the index of a doped region 67 within polysilicon layer 20. In the process of forming this device structure, it is to be understood that all of the desired doped areas within each layer are formed during the same processing step.

Referring to FIGS. 4(a)–(c), the manipulation of a light beam L in terms of deflection is illustrated as being controlled by voltages applied between the electrodes associated with each prism region. In the particular illustration of FIG. 4(a), no voltage is applied to any electrode, and the prism structure behaves as a passive optical waveguiding device, without any change in the propagating optical mode(s) at light beam L travels through doped prism regions 52 and 54, since the back-to-back prism structures will nullify each other's dispersion. When appropriate voltages are applied to electrodes 60–66, the index of the various doped areas 61, 63, 65 and 67 is changed, resulting in deflection of the optical mode(s). Referring to FIG. 4(b), by applying a first set of voltage levels to electrodes 60–66, the propagating mode(s) are illustrated as deflected "upward" (within the plane of the Figure). By applying a second set of voltages to electrodes 60–66, the propagating mode(s) may be redirected "downward", as shown in FIG. 4(c). Therefore, by changing the voltages applied to electrodes 60–66, an optical switch structure is provided that requires no moving parts. Indeed, although the embodiment of FIG. 4 illustrates deflection as occurring within the plane of the optical waveguide, a series of properly-oriented prism structures may be used to shift a beam upwards and downwards in the plane of the optical waveguide. As discussed above, the placement of electrodes 60–66 with respect to active region 29 of device 50 will determine the trade-off between switching speed and optical loss.

Bragg gratings are well-known optical structures that are used to perform various optical functions, such as optical filtering, group velocity dispersion control, attenuation and the like. The fundamental principle behind Bragg gratings is the small, periodic variation in the index (mode index) or propagation constant in a waveguide caused by a grating structure disposed in the waveguide, which then leads to a resonant condition for diffraction of certain wavelengths. Different wavelengths can be selected by changing the grating period. In the transmissive type of Bragg grating, the wavelengths of interest are selected to pass through the grating structure, with the remaining wavelengths reflected back along the waveguide. In the reflective type of Bragg grating, different wavelengths are selected to diffract "out" of the grating (typically in a direction normal to the grating, but any other angle may be chosen), thus forming a wavelength selective device.

In accordance with the present invention, Bragg gratings may be formed by including properly doped grating elements within SOI layer 16 and polysilicon layer 20 of the SISCAP structure as discussed above. FIG. 5 illustrates an exemplary transmissive Bragg grating structure, formed in accordance with the present invention. A Bragg grating 70 is illustrated as comprising a plurality of doped grating elements 72 disposed along the length of a waveguide region 74 formed in the active region 29 of a SISCAP structure by the overlap of SOI layer 16, gate oxide 18 and polysilicon layer 20, as discussed above. A first plurality of electrodes 76 is illustrated as associated with a like plurality of doped areas 77 within SOI layer 16, with a separate, individual electrode 76-$i$ used to control each doped area 77-$i$. A second plurality of electrodes 78 is illustrated as associated with a like plurality of doped areas 79 within polysilicon layer 20 such that the combination of doped areas 77 with doped areas 79 form the desired grating elements 72.

By controlling which electrodes are energized (as well as the strength of the signal applied to each electrode), the grating period of Bragg grating 70 may be modified in accordance with the present invention to provide the active manipulation of a propagating light beam. For example, by energizing every other electrode in first and second pluralities 76 and 78, a first Bragg grating period $\Lambda_1$ is realized, as shown in FIG. 5. This particular period will then allow an associated wavelength $\lambda_1$ to be transmitted along waveguide 74, with all remaining wavelengths reflected. By modifying the energized pattern, for example by energizing all electrodes, a different Bragg grating resonant wavelength will result. In this case, as also illustrated in FIG. 5, Bragg grating 72 will exhibit a grating period of $\Lambda_2$, allowing a different associated wavelength $\lambda_2$ to be transmitted.

In accordance with the present invention, therefore, an active Bragg grating structure 70 may be formed by adjusting the voltages applied to each separate, individual grating element 76 and 78, where the voltage adjustments will modify the index of the associated grating elements and form the desired Bragg structure. Additionally, since a Bragg grating is a resonant device, the ability to "tune" Bragg grating 70 in accordance with the present invention allows for the grating to be utilized with signals of an unknown "wavelength", adjusting the resonant cavity length accordingly. Indeed, variations in signal wavelength as a function of, for example, temperature or processing variations may be compensated by utilizing detectors at the input and output of the grating to measure the input/output power ratio and tuning the resonator based on this measurement.

Although not illustrated in this view, detectors may be disposed at the input and output of Bragg grating 70 to determine the particular wavelength that is transmitted by the given structure. By incorporating a feedback path between the detectors and the voltage sources for the individual electrodes, the Bragg grating can be "tuned" and monitored such that a lightwave signal at a desired wavelength is produced. Since fabrication process variations may alter the wavelength associated with a given Bragg grating, the ability to "tune" the structure is considered a significant aspect of the present invention. Additionally, the grating structure itself may be "chirped" (i.e., different spacing between adjacent elements), "apodized" (i.e., different envelope shape for grating structure), "blazed" (i.e., elements angled with respect to optical axis), or any combination of the above, where the characteristics of such Bragg gratings are well-known to those skilled in the art and may find a variety of uses as active, tunable devices.

FIG. 6 illustrates an alternative Bragg grating structure 700, where this particular structure is based on a "rib" waveguide confinement region O, as shown, where the rib is formed by the appropriate truncation of SOI layer 16 and polysilicon layer 20, as described below. In this configuration, a dielectric region 710 (comprising, for example, silicon dioxide) is disposed in the plane of SOI layer 16 and used to assist in the lateral confinement of the optical signal within active region 29 by truncating the extent of the silicon material forming SOI layer 16. Overlying polysilicon layer 20 is processed so as to remove that portion disposed over SOI layer 16 beyond gate oxide 18. This is illustrated by sidewall 720 as shown in FIG. 6, where the truncation of polysilicon layer 20 further aids in providing lateral confinement of the optical signal within active region 29. the ability for such a waveguide structure to be formed is considered to be an important component of providing a structure capable of supporting only the fundamental mode of a lightwave signal (thus preventing higher-order modes from appearing during signal propagation).

A first plurality of doped regions 730 within SOI layer 16 are utilized to form a portion of the "grating" structure, similar to Bragg grating 70 of FIG. 5. A second plurality of doped regions 740 are formed within polysilicon layer 20 and used to define the remaining portion of the grating structure for Bragg grating 700. A first plurality of electrical contacts 750 is used to control separate ones of doped regions 730 and a second plurality of electrical contacts 760 is used to similarly control separate ones of doped regions 740, providing the same type of Bragg grating adjustment/tunability as discussed above in association with FIG. 5.

As mentioned above, the free carrier effect can be exploited using both the phase change (real index, n) and absorption (imaginary index k). For inventive applications such as modulators, cross switches, dispersion compensators, ring resonators and the like, the active manipulation of light can be realized by changing the phase of the optical mode(s) passing through the device structure. In particular, amplitude modulation can be achieved using a version of a Mach-Zehnder interferometer (MZI) in which interference is produced between two coherent lightwaves that have a definite phase difference between them.

FIG. 7 illustrates an exemplary MZI 80 formed in accordance with the present invention, with FIG. 7(a) illustrating a top view and FIG. 7(b) illustrating an isometric view. As shown, MZI 80 includes active devices in both arms to control its performance. In general, MZI 80 is illustrated as including an input waveguiding section 82 and an input Y-splitter 84 so as to divide the input signal into two separate optical paths (arms) 86 and 88. The particular inventive arrangement as illustrated in FIGS. 7(a) and 7(b) utilizes a properly patterned polysilicon layer 20 to form the desired "Y-splitter" and "arm" geometries in accordance with the "rib"-type structures discussed above. As shown, polysilicon layer 20 can be tapered at the input (see portion 20-T) of MZI 80 to reduce reflections and enhance coupling efficiency into MZI 80. Similarly, polysilicon layer 20 may be properly shaped at the output of MZI 80 (see portion 20-O) to determine the divergence angle of the exiting beam, as shown in particular in FIG. 7(a). In particular, output portion 20-O of polysilicon layer 20 can be patterned so that the exiting beam matches the collimating optics (CO) disposed beyond MZI 80, resulting in very little signal loss. An important aspect of using a patterned polysilicon layer 20 to form this structure is that the vertical and lateral dimensions of active region 29 can be controlled such that the MZI will support the propagation of only the fundamental mode of the applied lightwave signal. The ability to support only the fundamental mode is particularly important at Y-combiner 90 such that single mode operation is supported from the input throughout the output of the MZI.

The introduction of a definite phase shift between arms 86 and 88 results in intensity modulation as the signals recombine in a Y-combiner 90 and are coupled into an output waveguiding section 92. A first active device 94, formed in accordance with the present invention, is illustrated as disposed along a section of first arm 86 and a second active device 96 is illustrated as disposed along a section of second arm 88. In particular, first active device 94 is illustrated as including a first doped area 91 in SOI layer 16 and a second doped area 93 in polysilicon layer 20. Similarly, second active device 96 is formed to include a first doped area 95 in SOI layer 16 and a second doped area 97 in polysilicon layer 20. In the particular embodiment of FIGS. 7(a) and (b), doped areas 91, 93, 95 and 97 are illustrated as rectangular in shape. In an alternative embodiment (not shown), the ends of the polysilicon rectangles may be tapered (along the direction of signal propagation) to prevent reflections. In any event, as with the active devices discussed above, a first electrical contact 100 for first active device 94 is made to doped area 91 of SOI layer 16 and a second electrical contact 102 is made to doped area 93 of polysilicon layer 20. A pair of electrical contacts 104 and 106 are similarly associated with doped areas 95 and 97 of second active device 96.

The propagation constant, $\beta$, of the propagating optical mode can be changed by free carrier injection or removal in active devices 94 and/or 96. The modulation depth, $\eta$, of MZI 80 can be defined as:

$$\eta = \left[1 - \cos^2\left[\frac{\Delta\beta L}{2}\right]\right],$$

where $\Delta\beta$ is the change in propagation constant due to the presence (or absence) of free carriers, and L is the path length of active device 94 or 96. Therefore, by adjusting the voltages applied to doped areas 91, 93, 95 and 97, the modulation depth of the inventive MZI 80 can be adjusted to control the desired results. Indeed, the output intensity of MZI 80 can be precisely controlled by using "fine tuning" control over $\Delta\beta$ (propagation constant) and hence in another embodiment an inventive can use the MZI as a dynamic gain equalizer or variable optical attenuator (VOA), with appropriate feedback control.

As with conventional MZI's, the active MZI of the present invention may operate in accumulation mode, depletion mode or inversion mode, depending upon the dopant conductivity types used in active regions 91, 93, 95 and 97, as well as the polarity of the voltages applied thereto. Further, multiple arrays of MZI's, either cascaded or parallel, may be formed using conventional CMOS processing techniques and used to provide more complicated signal control. All of these variations are considered to fall within the scope of the present invention.

An active optical switch may also be formed using the principles of the present invention, where FIG. 8 illustrates (in a top view) an exemplary active optical switch 110 formed in accordance with the principles of the present invention. Switch 110, formed in a SISCAP structure as described above, comprises a pair of single mode input waveguides 112, 114 and a pair of single mode output waveguides 116, 118, with a central waveguiding area 120 formed therebetween. In one embodiment, each waveguide section may be formed in only SOI layer 16. Alternatively, each waveguide section may consist of the "SISCAP" structure of SOI layer 16, gate oxide 18 and polysilicon layer 20. In either case, the formation of active device regions requires the addition of dopant material to selected portions of SOI layer 16 in combination of doped regions of polysilicon layer 20. Referring to FIG. 8, an active device region 122 is illustrated as disposed over central waveguiding area 120 (in this case, device region 122 being rectangular in form) and includes complementarily doped areas within SOI layer 16 and polysilicon layer 20. In particular, a first doped region 124 is formed SOI layer 16 and a second doped region 126 is formed in SOI layer 20, resulting in the overlapped rectangular structure as shown in FIG. 8. A first electrical contact area 128 is associated with doped region 124 of SOI layer 16 (and includes a heavily doped contact area 130). A second electrical contact area 132 is associated with doped region 126 of polysilicon layer 20, and similarly includes a heavily doped contact area 134.

In operation, an input, fundamental mode signal propagating through input waveguide 112 will generate both the fundamental mode and first order mode as the signal enters central waveguiding area 122. The difference between the propagation constants of the two modes is the above-defined $\Delta\beta$ value. If the length of active device region 122 is defined as L and $\Delta\beta L = \pi$, then the phases of the fundamental and first order modes will be reversed along the output waveguides, canceling light propagation in output waveguide 116. By applying a voltage between electrodes 128 and 134, in accordance with the teachings of the present invention, an additional change in propagation constant will result, consistent with the following equation:

$$(\Delta\beta + \Delta\beta_{free\ carrier})L = 2\pi,$$

$\Delta\beta_{free\ carrier}$ is defined as the change in the propagation constant associated with the change in refractive index. When an additional phase shift is added, the fundamental and first-order modes will add together in phase, resulting in switching the light output from waveguide 116 to waveguide 118.

FIG. 9 illustrates, in a top view, an alternative active optical switch structure 200 where separate active optical devices may be included along parallel arms of the switch to control the switching function. In particular, switch 200 is illustrated as including an input waveguiding section 210, in this case formed within SOI layer 16, and then branches into a Y-splitter section 211 to form a pair of parallel switch arms 212 and 214. As with the structure of FIG. 8, the various passing waveguiding portions may be formed only in SOI layer 16, or in the combination of SOI layer 16, gate oxide 18 and polysilicon layer 20. In accordance with the present invention, a separate active optical device is disposed over a region of each arm and using to control the effective path length "seen" by a propagating optical signal and thus introduce any desired phase shift between the two propagating beams. A first active device 220 is formed by doping a selected portion 222 of SOI layer 16 in a predetermined area. A polysilicon region 224 is formed over doped SOI portion 222 and infused with a complementary doping material to form active device 220. In this particular embodiment, polysilicon region 224 is patterned to include an input tapered region 223 and output tapered region 225. As mentioned above, the use of a tapered polysilicon region will reduce reflections and promote efficient coupling between SOI layer 16 and the combination of SOI layer 16/gate oxide 18/polysilicon layer 20. A pair of electrical contacts 226, 228 are disposed in relation to doped regions 222 and 224 and used to modify the electrical potential through active device 220 and therefore provide an arrangement to control the "length" of arm 212.

In a similar fashion, a second active device 230 is formed within a portion of second waveguide arm 214 and can be controlled by electrodes 232 and 234 to likewise modify the optical path length "seen" by a propagating signal. Therefore, by controlling the voltages applied to first and second active devices 220, 230, various phase delays can be introduced into each signal path. The phase difference between the optical signals, upon entering directional coupling arrangement 240, will therefore control the power level of the signals appearing along separate output arms 250 and 252 of active switching device 200.

An add/drop ring resonator structure may also be formed as an active device in accordance with the teachings of the present invention. FIG. 10 illustrates an exemplary add/drop ring resonator 130 including a single mode waveguiding structure 132 and associated ring resonator 134, formed (as discussed above) in either SOI layer 16 or the combination of SOI layer 16, gate oxide 18 and polysilicon layer 20. In its most basic form, the physical dimensions of ring resonator 134 dictate a particular wavelength (or range of wavelengths) that may be out-coupled from a multi-wavelength signal propagating along waveguide 132 (when used in the "drop" mode). Referring to FIG. 10, this aspect is illustrated by a signal propagating at a wavelength of $\lambda_2$ being coupled into ring resonator 134, and thereafter launched (in a counter-propagating direction) along a second single mode waveguide 136. Similarly, an optical signal at a predetermined wavelength that is coupled from second waveguide 136 into ring resonator 134 will subsequently be coupled into waveguide 132 (when used in the "add" mode).

In accordance with the present invention, the wavelength sensitivity of ring resonator 134 may be modified by including an active device section 138 along a portion thereof. As with the active devices discussed above, active device section 138 comprises a first doped area 140 within a particular portion of SOI layer 16 and an overlying doped area 142 (doped to exhibit a complementary dopant type) formed in polysilicon layer 20. A pair of electrical contacts 144 and 146 are coupled to doped regions 140 and 142 of SOI layer 16 and polysilicon layer 20, respectively. By modifying the voltage applied between electrical contacts 144 and 146, the optical path length of ring resonator 134 will be modified, thus changing the particular wavelength(s) that can be coupled into/out of waveguide section 132. Moreover, by "tuning" ring resonator 134 into and out of its resonance condition, a tunable optical modulator may be formed.

Obviously, a ring resonator structure of the present invention may comprise a plurality of separate rings, each formed using similar processing techniques. In one arrangement, the separate rings are disposed along a waveguide, with each ring appropriate sized and "tuned" to add/drop a different wavelength. In an alternative embodiment, a plurality of rings may be "stacked" in a direction normal to the waveguide, providing greater and greater wavelength selectivity between adjacent rings. Any of these variations are possible and may be provided by conventional, well-known CMOS processing techniques. Indeed, it is possible to combine one of the active switch arrangements discussed above with the inventive active ring resonator to form a structure that provides tunable wavelength coupling into a ring resonator. Another monolithic structure may comprise the pairing of a ring resonator (or Bragg grating) with a modulator. By virtue of utilizing the SISCAP structure in conjunction with an SOI base, the integration of multiple devices in a single silicon substrate is relatively straightforward, based on the use of conventional CMOS processing techniques.

Thin (i.e., sub-micron) SOI waveguides are known to be polarization dependent and as a result the incoming signal polarizations need to be rotated accordingly. For example, when using prism coupling, only the TE mode of an input signal will be properly coupled. Therefore the TM component of the signal must be rotated to the TE polarization mode, and then recombined with the "true" TE mode to form the desired signal. However, if the phases of the two beams are different, the resultant recombined beam can suffer loss (due to interference effects). One method to minimize this loss is to use a polarization combiner formed in accordance with the present invention. FIG. 11 illustrates one such exemplary on-chip active polarization combiner 150 formed in a SISCAP structure (as discussed above) in accordance with the present invention. As shown, an original TE polarization component is coupled into a first waveguide 152, waveguide 152 formed from the SISCAP structure described above that includes a combination of SOI layer 16, gate oxide 18 and polysilicon layer 20 to form active region 29. The "rotated" TE mode signal (that had originally been of TM polarization) is applied as an input to a second waveguide 154, where waveguides 152 and 154 are joined in a Y-combiner portion 156 and subsequently coupled into an output waveguide 158.

Active phase shifting between the two polarized signals is accomplished in accordance with the present invention by utilizing an active optical device along either one or both of waveguides 152, 154. In the particular embodiment of FIG. 11, a first active device 160 is illustrated as formed along a portion of first waveguide 152 and a second active device 162 is illustrated as formed along a portion of second waveguide 154. As with the various other active devices described above, active devices 160, 162 are formed by properly doping selected areas of SOI layer 16 and polysilicon layer 20. As shown, first active device 160 includes a doped area 161 in SOI layer 16 and a similarly-shaped doped area 163 in polysilicon layer 20. Second active device 162 includes similarly formed doped areas 165 and 167. A first pair of electrical contacts 170, 172 are illustrated as associated with doped areas 161, 163 of first active device 160 and a second pair of electrical contacts 174, 176 are illustrated as associated with doped areas 165, 167 of second active device 162. By controlling the voltages applied to one or both of these devices, the optical path lengths of waveguides 152 and 154 can be modified, thus adjusting the phase shift between the TE and "rotated" TE components propagating therealong. Careful adjustment of these voltages can therefore be used to properly combine the signals along output waveguide 158 with little, if any, signal loss.

FIG. 12 illustrates, in an isometric view, an exemplary active Fabry-Perot (FP) device 180 formed in accordance with the present invention, where the inclusion of an active optical device 182 in cavity region 184 of FP device 180 can be used to modify the optical path length (and therefore, the resonance) of FP device 180. In operation, FP device 180 includes an input grating structure 186 formed by etching a portion of polysilicon layer 20, as shown. An output grating structure 188 is similarly formed in polysilicon layer 20, where cavity region 184 is defined as the extent of the waveguiding region between input grating structure 186 and output grating structure 188. Depending upon the wavelength of the optical signal propagating through the waveguide formed by the combination of SOI layer 16, gate oxide 18 and polysilicon layer 20, certain wavelengths will be reflected between gratings 186 and 188. Thus, in accordance with the present invention, by including active device 182 in cavity region 184, the wavelength sensitivity of FP device 180 can be adjusted. Further, by using active device 182 to tune FP device 180 into and out of resonance, an optical modulator may be formed.

As shown, active device 182 includes a first doped area 190 within SOI layer 16 and a second doped area 192 within polysilicon layer 20. Electrodes 194 and 196 are coupled, respectively, to doped areas 190 and 192, where the application of a voltage potential between these electrodes will affect the optical path length within cavity region 184. Input and output detectors (not shown), when used in combination with FP device 180 allow for feedback and control of the resonant wavelength within the cavity by allowing the applied voltages to be adjusted in accordance with the measured values at the input and output of the device.

An important class of optical filters is represented by "arrayed waveguide gratings" (AWGs). An AWG is defined as a planar structure comprising a number of array waveguides whose arrangement emulates the functionality of a diffraction grating. AWGs are commonly used as multiplexers or demultiplexers, and can also be designed to perform as passive, wavelength selective, strictly non-blocking cross-connects for sets of optical channels. For example, AWGs can simultaneously operate as a multiplexer and demultiplexer by distributing and recombining multiple frequencies entering any number of input ports into any of a multiple number of output ports. One problem with prior art AWG structures is the need to carefully control the path lengths between the couplers forming the structure. In a planar integrated optics structure, this requirement often necessitated the use of arc-like optical paths, a difficult geometry to manufacture with any great consistency.

Thus, an active AWG structure 400 as formed in accordance with the present invention may utilize a plurality of active devices, one device disposed along each signal path, to provide the desired variations in optical path length without resorting to changing the physical paths at all. FIG. 13 illustrates AWG 400 as including an input coupling region 410 and an output coupling region 420, where AWG 400 is generally formed within layers 16, 18 and 20 of the SISCAP structure as discussed above. Input coupling region 410 is illustrated as comprising a single input waveguide 412 and a plurality of N separate output waveguides 414, where various different wavelengths will appear at separate ones of output waveguides 414. Output coupling region 420 is illustrated as comprising a plurality of N input waveguides 422, each coupled in a one-to-one relationship with the plurality of N output waveguides 414 from input coupling region 410. Output coupling region 420 further comprises a plurality of N output waveguides 424.

In accordance with the operation of AWG 400, the desired diffraction properties arise from varying the lengths of the separate waveguides within the plurality of waveguides 430 interconnection waveguides 414 with waveguides 422. Referring to FIG. 13, each waveguide 430-I is shown as including a separate active optical device 440. In its simplest form, each active device is essentially identical in form, although this is not a required. As with the arrangements discussed above, active optical device 240 comprises a first doped region 441 within SOI layer 16 and an overlying (similarly shaped) second doped region 443 within polysilicon layer 20. For the sake of simplicity, only one active device 440 is specifically called out in the arrangement of FIG. 13, although each device comprises similar elements. A first electrical contact 442 is coupled to and controls first doped region 241 within SOI layer 16 and a second electrical contact 444 is coupled to and controls second doped region 443 within polysilicon layer 20. Thus, when an appropriate voltage potential is applied between first electrical contact 442 and second electrical contact 444, the optical path length of the associated waveguide 430 will be modified, providing the desired diffraction effect.

Accordingly, each separate active device 430 in AWG structure 400 is controlled by a different voltage potential, so as to create a plurality of different path lengths to form the diffraction grating. Advantageously, the voltages may be "tuned" or changed to modify the properties of AWG 400, as needed. Indeed, the operational wavelengths associated with desired diffraction effect can simply be changed by modifying the applied voltages. As a result, wavelength-selective routing between different output ports can be achieved by modifying the voltages applied to the various active devices. The ability to provide wavelength-selective routing and switching in such an arrayed waveguide structure is considered to be a significant advance of the state of the art. Heretofore, any modification in the operation of an AWG structure necessitated a complete change in the physical layout and design.

Moreover, by monitoring the output signals from waveguides 424, the operation of AWG 400 can be controlled, with feedback signals from one or more of these waveguides used to adjust, in real time, the voltages applied to associated ones of active devices 430.

While the above embodiments are considered to be illustrative of the concepts of the present invention, it is to be understood that there exist a wide variety of other planar optical devices that may be formed as active devices in a SISCAP structure in accordance with the present invention. For example, Fresnel lenses may be "tuned" using the doped device structure as described above. An active, adjustable multimode interference (MMI) splitter, as discussed in our co-pending application Ser. No. 10/830,571 filed Dec. 23, 2004, may also be formed, where one or more active devices are formed along the walls of the structure to modify the generated interference pattern. Planar optical multiplexers/demultiplexers may also be formed as wavelength-selective active devices, capable of adding or dropping predetermined wavelengths by virtue of adjustments of the voltages applied thereto.

It is an advantage of the SOI-based SISCAP structure for active optical devices in accordance with the present invention that the various electrical components associated with the operation and control of these active devices may be integrated within the same integrated circuit chip and, moreover, be formed during the same CMOS-type processing steps used to form the optical device components. It is also possible to use a material other than polysilicon over the overlying "silicon" layer of the SISCAP structure. For example, amorphous silicon, single crystal silicon and substantially single crystal silicon, among others, may be used.

The present invention has been set forth with reference to certain particularly preferred embodiments. Those of ordinary skill in the art will appreciate that the present invention need not be limited to these presently preferred embodiments and will understand that various modifications and extensions of these embodiments may be made within the scope of the subject matter of the present invention. Consequently, the present invention is not intended to be limited to any of the described embodiments, but is instead to be defined by the claims appended hereto.

What is claimed is:

1. An SOI-based optical arrangement for actively manipulating a lightwave signal propagating in a silicon-insulator-silicon capacitive (SISCAP) waveguide, the SISCAP waveguide including a sub-micron surface silicon layer (SOI layer) of the SOI-based optical arrangement, a relatively thin dielectric layer overlying at least a portion of the SOI layer and an upper silicon layer overlying a combination of the SOI layer and the relatively thin dielectric layer, the arrangement for actively manipulating a lightwave signal comprising
at least one doped area formed in the SISCAP waveguide area of the SOI layer, the at least one doped area having a first conductivity type;
at least one doped area formed in the upper silicon layer so as to overlap at least a portion of the at least one doped area formed in the SOI layer to create an active optical region, the at least one doped area in the upper silicon layer having a second, opposite conductivity type; and
separate electrical contact regions associated with each doped area, wherein upon the application of a voltage to one or more of the separate electrical contact regions, the refractive index of the associated doped area will be modified to create regions for manipulating the properties of the propagating lightwave signal.

2. An SOI-based optical arrangement for actively manipulating a lightwave signal as defined in claim 1 wherein the shape of the at least one doped area in the SOI layer and the shape of the at least one doped area in the upper silicon layer are defined to provide a desired optical manipulating function.

3. An SOI-based optical arrangement for actively manipulating a lightwave signal as defined in claim 2 wherein the overlying combination of doped areas are shaped to provide a beam shaping function upon the application of an electrical signal thereto.

4. An SOI-based optical arrangement for actively manipulating a lightwave signal as defined in claim 3 wherein the SOI layer comprises a plurality of shaped, doped areas and the upper silicon layer comprises a like plurality of shaped, doped areas disposed to form a plurality of separate beam shaping elements, each beam shaping element separately controlled by its associated separate electrical contact regions, wherein the application of different combinations of electrical signals allows for a propagating optical lightwave to be variously manipulated, including changing the focal point of the arrangement.

5. An SOI-based optical arrangement for actively manipulating a lightwave signal as defined in claim 2 wherein the overlying combination of doped areas are shaped to provide a two-dimensional prism-like function upon the application of an electrical signal thereto.

6. An SOI-based optical arrangement for actively manipulating a lightwave signal as defined in claim 2 wherein the overlying combination of doped areas comprise a plurality of like-positioned grating elements, each grating element being individually controlled by an associated pair of electrical contact regions for selectively energizing ones of the grating elements and actively manipulating the period of the grating structure.

7. An SOI-based optical arrangement for actively manipulating a lightwave signal as defined in claim 6 wherein the formed grating is a transmissive grating structure, with selected ones of the electrical contact regions being energized to actively control the wavelength(s) transmitting through the grating and the wavelength(s) reflected by the grating.

8. An SOI-based optical arrangement for actively manipulating a lightwave signal as defined in claim 2 wherein the overlying combination of doped areas are shaped to provide an active optical resonator structure upon the application of an electrical signal thereto.

9. An SOI-based optical arrangement for actively manipulating a lightwave signal as defined in claim 8 wherein the active optical resonator structure further comprises
   a first optical detector disposed at the input of the active optical resonator and used to determine the wavelength of an optical signal applied as an input thereto;
   a second optical detector disposed at the output of said optical resonator and used to determine the wavelength of an optical signal exiting at the output thereof;
   an optical power measuring arrangement responsive to the first and second optical detectors for providing adjustments to the active optical resonator in response thereto.

10. An SOI-based optical arrangement for actively manipulating a lightwave signal as defined in claim 9 wherein the resonator comprises a ring resonator structure.

11. An SOI-based optical arrangement for actively manipulating a lightwave signal as defined in claim 9 wherein the resonator comprises a Fabry-Perot structure.

12. An SOI-based optical arrangement for actively manipulating a lightwave signal as defined in claim 1 wherein the arrangement comprises a Mach-Zehnder interferometer including
   an input waveguide portion including a patterned section of the upper silicon layer for defining the waveguide lateral confinement area;
   an input Y-shaped portion coupled to the input waveguide portion for dividing the propagating lightwave signal into a pair of separate lightwave signals, the input Y-shaped portion including a patterned section of the upper silicon layer for defining the Y-splitting separate confinement areas;
   a first waveguide coupled to a first arm of the input Y-shaped portion and including a patterned section of the polysilicon layer for defining the first waveguide lateral confinement area;
   a second waveguide coupled to a second, remaining arm of the input Y-shaped portion and including a patterned section of the polysilicon layer for defining the second waveguide lateral confinement area;
   an output Y-shaped portion coupled, at its first and second arms, to the first waveguide termination and second waveguide termination, respectively, for combining the pair of separate signals into an output lightwave signal, the output Y-shaped portion including a patterned section of the upper silicon layer to provide for lateral confinement and combining of the pair of separate signals;
   an output waveguide portion coupled to the output Y-shaped portion for receiving the output lightwave signal, the output waveguide portion including a patterned section of the upper silicon layer for defining the waveguide lateral confinement area; and
   and at least one active device region formed along a section of at least one of the first and second waveguides, the at least one active device region comprising oppositely-doped areas of the SOI layer and upper silicon layer such that upon application of an electrical signal to the associated electrical contact regions the optical path length of the at least one of the first and second waveguides is changed to manipulate the propagation of the lightwave signal therethrough.

13. An SOI-based optical arrangement as defined in claim 12 wherein the Mach-Zehnder interferometer comprises at least one active device region disposed along only the first waveguide.

14. An SOI-based optical arrangement as defined in claim 12 wherein the Mach-Zehnder interferometer comprises at least one active device region disposed along both the first and second waveguides.

15. An SOI-based optical arrangement as defined in claim 12 wherein the patterned upper silicon section of the input waveguide portion includes an input taper for improving optical coupling into the Mach-Zehnder interferometer.

16. An SOI-based optical arrangement as defined in claim 12 wherein the patterned upper silicon sections of the Mach-Zehnder interferometer are configured to provide lateral confinement such that only the fundamental mode of a propagating lightwave signal can be supported.

17. An SOI-based optical arrangement as defined in claim 12 wherein the patterned upper silicon section of the output waveguide portion is configured to create a predetermined beam divergence for an exiting lightwave signal.

18. An SOI-based optical arrangement as defined in claim 12 wherein each of the patterned silicon sections are substantially undoped except for the at least one active device region.

19. An SOI-based optical arrangement for actively manipulating a lightwave signal as defined in claim 1 wherein the arrangement comprises a ring resonator structure comprising
   a transmitting waveguide portion; and
   at least one ring-shaped waveguide resonator disposed adjacent to the transmitting waveguide portion such that predetermined wavelengths will evanescently couple between the ring-shaped waveguide and the transmitting waveguide portion, wherein the at least one ring-shaped waveguide resonator including at least one active device region comprising oppositely-doped areas of the SOI layer and upper silicon layer such that upon application of an electrical signal to the associated electrical contact regions the optical path length of the at least one waveguide resonator is changed to manipulate the predetermined wavelengths that evanescently couple between the transmitting waveguide portion and the at least one ring-shaped waveguide resonator.

20. An SOI-based optical arrangement as defined in claim 19 wherein the ring resonator structure comprises a plurality of separate ring-shaped waveguide resonators disposed along the length of the transmitting waveguide portion, each ring-shaped waveguide resonator associated with a different, predetermined coupling wavelength.

21. An SOI-based optical arrangement as defined in claim 19 wherein the ring resonator structure comprises a plurality of separate ring-shaped waveguide resonators disposed in a contiguous, stacked arrangement to support a higher-order resonance condition.

22. An SOI-based optical arrangement for actively manipulating a lightwave signal as defined in claim 1 wherein the arrangement comprises an active optical switch including
- at least one input waveguide portion;
- at least two separate output waveguide portions; and
- a combining waveguide portion disposed between the at least one input waveguide portion and the at least two separate output waveguide portions so as to selectively couple a lightwave signal between separate ones of the output waveguide portions; and
- at least one active device region comprising oppositely-doped areas of the SOI layer and upper silicon layer formed along a selected portion of the combining waveguide portion such that upon application of an electrical signal to the associated electrical contact regions the optical path length of the combining waveguide portion is changed to manipulate the selective coupling between the at least two separate output waveguide portions.

23. An SOI-based optical arrangement as defined in claim 22 wherein the combining waveguide portion includes a patterned SOI layer defined to maintain lateral confinement of a lightwave signal such that only a fundamental mode of the propagating signal is supported.

24. An SOI-based optical arrangement for actively manipulating a lightwave signal as defined in claim 1 wherein the arrangement comprises an active optical polarization combiner including
- a first input waveguide for supporting the propagation of the TE polarization mode of a lightwave signal;
- a second input waveguide for supporting the propagation of the TE polarization mode of a lightwave signal, input to the second input waveguide having been rotated from the TM polarization to the TE polarization;
- a combining waveguide region coupled to the first and second input waveguides to combine the propagating signals;
- an output waveguide for propagating the re-combined lightwave signals; and
- at least one active device disposed along a portion of at least one of the first and second input waveguides, the at least one active device comprising oppositely-doped areas of the SOI layer and upper silicon layer such that upon application of an electrical signal to the associated electrical contact regions, the optical path length of at least one of the first and second input waveguides is modified to adjust the phase of the propagating signals and enable constructive addition of the power of the lightwave signals propagating therethrough.

25. An SOI-based optical arrangement as defined in claim 24 wherein the combining waveguide region is formed to provide lateral confinement sufficient to permit propagation of only the fundamental mode of the lightwave signal.

26. An SOI-based optical arrangement as defined in claim 24 wherein at least one active optical device is disposed along the first input waveguide and at least one active optical device is disposed along the second input waveguide.

27. An SOI-based optical arrangement for actively manipulating a lightwave signal as defined in claim 1 wherein the at least one doped area in the SOI layer is of n-type conductivity and the at least one doped area in the upper silicon layer is of p-type conductivity.

28. An SOI-based optical arrangement for actively manipulating a lightwave signal as defined in claim 1 wherein the at least one doped area in the SOI layer is of p-type conductivity and the at least one doped area in the upper silicon layer is of n-type conductivity.

29. An SOI-based optical arrangement for actively manipulating a lightwave signal as defined in claim 1 wherein the SOI layer comprises a strained lattice Ge-doped single crystal silicon layer.

30. An SOI-based optical arrangement for actively manipulating a lightwave signal as defined in claim 1 wherein the upper silicon layer comprises a sub-micron thickness silicon material chosen from the group consisting of: polysilicon, amorphous silicon, grain-size enhanced polysilicon, grain-boundary passivated polysilicon, grain-boundary aligned polysilicon, single crystal silicon, substantially single crystal silicon and Ge-doped silicon.

31. An SOI-based optical arrangement for actively manipulating a lightwave signal as defined in claim 2 wherein the SISCAP waveguide structure is formed as an arrayed waveguide (AWG) structure including
- an input N×M coupling region;
- an output M×P coupling region; and
- a plurality of M waveguides, each individual waveguide for coupling a separate one of the outputs from the input N×M coupling region to a separate one of the inputs to the output M×P coupling region, wherein at least one waveguide of the plurality of M waveguides includes the overlying combination of doped areas in the SOI layer upper silicon layer to form an active optical device for modifying the optical path length of the at least one waveguide and controlling the wavelength selectivity of the AWG structure.

32. An SOI-based optical arrangement as defined in claim 31 wherein each waveguide of the plurality of M waveguides includes a separately controllable active optical device such that the optical path length of each waveguide is individually adjustable.

33. An SOI-based optical arrangement as defined in clam 32 wherein the plurality of M waveguides each comprises essentially the same physical length.

34. An SOI-based optical arrangement for actively manipulating a lightwave signal as defined in claim 1 wherein the arrangement comprises a multi-mode interference (MMI) splitter including
- an input waveguiding section;
- a cavity waveguiding area coupled to the input waveguiding section including a plurality of reflective walls for generating interference between reflected portions of a propagating lightwave signal; and
- at least one output waveguiding section coupled along a wall of the cavity waveguiding area for out-coupling defined wavelengths of a propagating lightwave signal, wherein the overlying combination of doped areas is formed in at least one location within a reflective wall of the cavity waveguiding area so as to modify the optical length of the cavity waveguiding area and alter the defined wavelengths coupled into the at least one output waveguiding section.

35. An SOI-based optical arrangement for actively manipulating a lightwave signal as defined in claim 1, wherein the arrangement comprises an active directional coupling switch including
- an input waveguiding section;
- an input Y-splitting waveguiding section coupled to the input waveguiding section;
- a pair of waveguiding arms coupled to the terminations of the Y-splitting waveguiding section, each waveguiding arm including at least one active device region comprising oppositely-doped areas of the SOI layer and upper silicon layer such that upon application of an electrical signal to the associated electrical contact regions the optical path length of the associated waveguiding arm is modified to introduce phase shifting between propagating lightwave signals;

an evanescent coupling arrangement coupled to the termination of the pair of waveguiding arms; and a pair of separate output waveguiding sections coupled to the evanescent coupling arrangement, wherein the application of electrical signals to the active devices within each waveguiding arm is utilized to control switching between the pair of separate output waveguiding sections.

36. An SOI-based optical arrangement for actively manipulating a lightwave signal as defined in claim 1, wherein the arrangement comprises an active Fabry-Perot device comprising an input grating structure formed in a first portion of the upper silicon layer;

an output grating structure formed in a second portion of the upper silicon layer; and a resonant cavity defined by the region between the input grating and the output grating, the resonant cavity including at least one active device region comprising oppositely-doped areas of the SOI layer and the upper silicon layer such that upon application of an electrical signal to the associated electrical contact regions the optical path length of the resonant cavity is modified to adjust the wavelength sensitivity of the Fabry-Perot device.

37. An SOI-based optical arrangement as defined in claim 36 wherein the arrangement further comprises a first optical detector, disposed before the input grating structure, and used to determined the wavelength of an optical signal applied as an input thereto;

a second optical detector, disposed after the output grating structure, and used to determine the wavelength of an optical signal exiting at the output thereof; and an optical power measuring arrangement responsive to the first and second optical detectors for providing adjustments to the active Fabry-Perot device in response thereto.

* * * * *